US008670035B2

(12) United States Patent
Robert

(10) Patent No.: US 8,670,035 B2
(45) Date of Patent: Mar. 11, 2014

(54) SIDE MIRROR SYSTEM WITH VIDEO DISPLAY

(76) Inventor: Marc Robert, Ottawa (CA)

(*) Notice: Subject to any disclaimer, the term of this patent is extended or adjusted under 35 U.S.C. 154(b) by 554 days.

(21) Appl. No.: 12/976,609

(22) Filed: Dec. 22, 2010

(65) Prior Publication Data

US 2011/0149077 A1 Jun. 23, 2011

Related U.S. Application Data

(60) Provisional application No. 61/289,110, filed on Dec. 22, 2009.

(51) Int. Cl.
*H04N 7/18* (2006.01)
*B60R 11/04* (2006.01)

(52) U.S. Cl.
CPC ................................. *B60R 11/04* (2013.01)
USPC ........................ 348/148; 348/143; 348/159

(58) Field of Classification Search
CPC .................................................. B60R 11/04
USPC ............................. 348/148, 143, 159
See application file for complete search history.

(56) References Cited

U.S. PATENT DOCUMENTS

| 3,689,695 | A | 9/1972 | Rosenfeld et al. |
|---|---|---|---|
| 4,277,804 | A | 7/1981 | Robison |
| 5,289,321 | A | 2/1994 | Secor |
| 5,530,421 | A | 6/1996 | Marshall et al. |
| 6,320,612 | B1 | 11/2001 | Young |
| 6,498,620 | B2 | 12/2002 | Schofield et al. |
| 7,006,129 | B1 | 2/2006 | McClure |
| 7,446,650 | B2 * | 11/2008 | Scholfield et al. ............ 340/438 |

* cited by examiner

*Primary Examiner* — Geepy Pe
(74) *Attorney, Agent, or Firm* — Montgomery Patent & Design; Robert C. Montgomery

(57) ABSTRACT

An apparatus that provides an electronic image of areas around sides and rear of a large tractor trailer rig produced on a weatherproof screen that is located on the lower portion of the driver's side mirror. One (1) camera would be located on the rear of the trailer in a center mounted position, while another camera would be located on a passenger side near the front of the vehicle so that it can see the entire side of the vehicle. The cameras would be equipped with fixed wide-angle lenses. The video signal from each camera would be routed to an automatic switcher that displays each signal for a pre-determined time or allows for the manual selection of either camera on a permanent basis. The video signal is then displayed on the weatherproof monitor portion of the side view mirror. In such a manner the truck driver can look at the mirror and the monitor in order to see all three (3) sides of the vehicle at once. This feature eliminates looking in various directions to check for obstructions while backing up or changing lanes.

16 Claims, 6 Drawing Sheets

SIDE MIRROR SYSTEM WITH VIDEO DISPLAY

RELATED APPLICATIONS

The present invention was first described in and claims the benefit of U.S. Provisional Application No. 61/289,110 filed Dec. 22, 2009, the entire disclosures of which are incorporated herein by reference.

FIELD OF THE INVENTION

The present invention relates generally to motor vehicle side mirrors, and in particular, to a motor vehicle side mirror assembly including a digital video screen and a plurality of cameras.

BACKGROUND OF THE INVENTION

Drivers of larger tractor trailer rigs have a commanding view of the road while traveling in a forward manner down the highway. However, their view is very limited when changing lanes or backing up into a tight loading dock. Mirrors help to some extent, but require the driver to quickly move their head to see both sides of the vehicle. This of course leaves the rear of the vehicle unprotected.

As a result of this deficiency, there are a number of commercially available small electronic cameras that are positioned on the rear of the trailer and which display an image on a dash-mounted monitor. While once again this helps, it now requires the driver to look in three (3) different locations when backing up. Furthermore, viewing a screen at a dashboard location is counter-intuitive due to the usual lack of a viewing device in that location.

Various attempts have been made to provide motor vehicle video cameras. Examples of these attempts can be seen by reference to several U.S. patents. U.S. Pat. No. 3,689,695, issued in the name of Rosenfield et al., describes a vehicle viewing system including a television camera mounted on a support which permits vertical, horizontal, rotary, lateral, and tilting movement.

U.S. Pat. No. 5,289,321, issued in the name of Secor, describes a rear viewing arrangement for a motor vehicle including a plurality of rearward facing cameras which are reproduced on an LCD viewing screen integrated on the vehicle dashboard.

U.S. Pat. No. 6,320,612, issued in the name of Young, describes a vehicular camera system with plural perspectives including a processor which transmits a video signal of either a tight or left perspective of the camera based upon biasing of the turn signal lever.

U.S. Pat. No. 7,006,129, issued in the name of McClure, describes a rear-view display system for a vehicle including a display which replaces a conventional center-mounted rear-view minor.

While these systems fulfill their respective, particular objectives, each of these references suffer from one (1) or more of the aforementioned disadvantages. Many such systems do not provide a sufficient plurality of views in order to ensure full vision about a vehicle. Also, many such systems are unsafe or insufficient for use in large trucks, particularly those without center mounted rear view mirrors. Furthermore, many such systems do not incorporate a display in a location which is normally viewed by a user when checking for nearby traffic. In addition, many such systems cannot be easily retrofit to an existing vehicle. Moreover, may such systems do not allow simultaneous display of all available views. Accordingly, there exists a need for a side mirror and video display system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a retrofittable system which incorporates a plurality of camera views into a conventional mirror assembly for a truck in a manner which allows intuitive simultaneous viewing of all surrounding areas. Thus, the object of the present invention is to solve the aforementioned disadvantages and provide for this need.

To achieve the above objectives, it is an object of the present invention to provide a system for a truck rig which enables viewing all sides of an attached trailer using a single display, particularly when backing up or changing lanes. The system includes a video display integrated into a driver's side mirror assembly, a first camera located at a top center portion along a rear portion of the trailer, and a second camera located on a side door of a tractor portion of the truck rig.

Another object of the present invention is to allow simultaneous viewing of all video outputs within the video display.

Yet still another object of the present invention is to allow retrofit installation of the various components of the system on an existing vehicle.

Yet still another object of the present invention is to provide a full view of all of the usual "blind spots" of the vehicle by comprising each camera of a wide-angle digital camera including advanced video enhancement hardware and software.

Yet still another object of the present invention is to provide protection for each camera with a shroud mount assembly which further facilitates attachment to a surface of the truck rig. Each mount assembly includes a plurality fastening apertures and shields a camera from projectiles, weather, dust, impact, and the like to keep the camera safe and clean during transport.

Yet still another object of the present invention is to comprise a mirror assembly which integrally houses and protects the video display. The mirror assembly comprises a mirror frame and a glass surface and replaces a side view mirror while providing a weatherproof seal to the interior portions of the mirror assembly, including the video display.

Yet still another object of the present invention is to dispose the video display behind a lower portion of the glass surface of the mirror assembly to allow simultaneous observation of a side view as seen in the mirror and the plurality of other views provided by the cameras as seen in the video display.

Yet still another object of the present invention is to enable cleaning and washing of the system due to the watertight seal between the glass surface and mirror frame.

Yet still another object of the present invention is to deter theft of the mirror assembly by deactivating the video display when the system is turned off, thereby discreetly containing the video display behind the glass cover.

Yet still another object of the present invention is to enable the video display to be safely utilized in direct sunlight by comprising a display of sufficient illuminated brightness and eliminate "wash out".

Yet still another object of the present invention is to ensure a full, clear view of the system during cold weather conditions by comprising an internal electric heating element located within the mirror assembly to melt and defrost the glass surface prior to and during use.

Yet still another object of the present invention is to provide manual control of various functions of the system with a video module located within a cab portion of the truck rig. The video module includes a selector knob allows the user to control various functions including an ON/OFF function, automatic sequential display of each video signal, and selection of a particular view on the display. The video module further includes a multiplexer circuit and a plurality of video display drivers to perform advanced automatic video functions and ensure a clear display.

Yet still another object of the present invention is to allow connection of additional cameras to the video module, thereby enabling the user to selectively add additional cameras and views as desired at any time.

Yet still another object of the present invention is to provide a method of installing and utilizing the device that provides a unique means of obtaining the system, attaching the cameras to the truck rig by fastening the mount assemblies, installing the mirror assembly at a driver's side window location, mounting the video module to a dashboard area of the tractor, anchoring and connecting the wiring harness to the various components of the system, turning the system on, viewing the various camera views within the video display, adjusting the positioning of the mount assemblies as necessary, utilizing the heating element to melt and defrost the glass surface during use, and observing the video display portion and glass portion of the mirror assembly while operating the truck rig in a normal manner while backing up or while changing lanes to increase safety and visibility.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
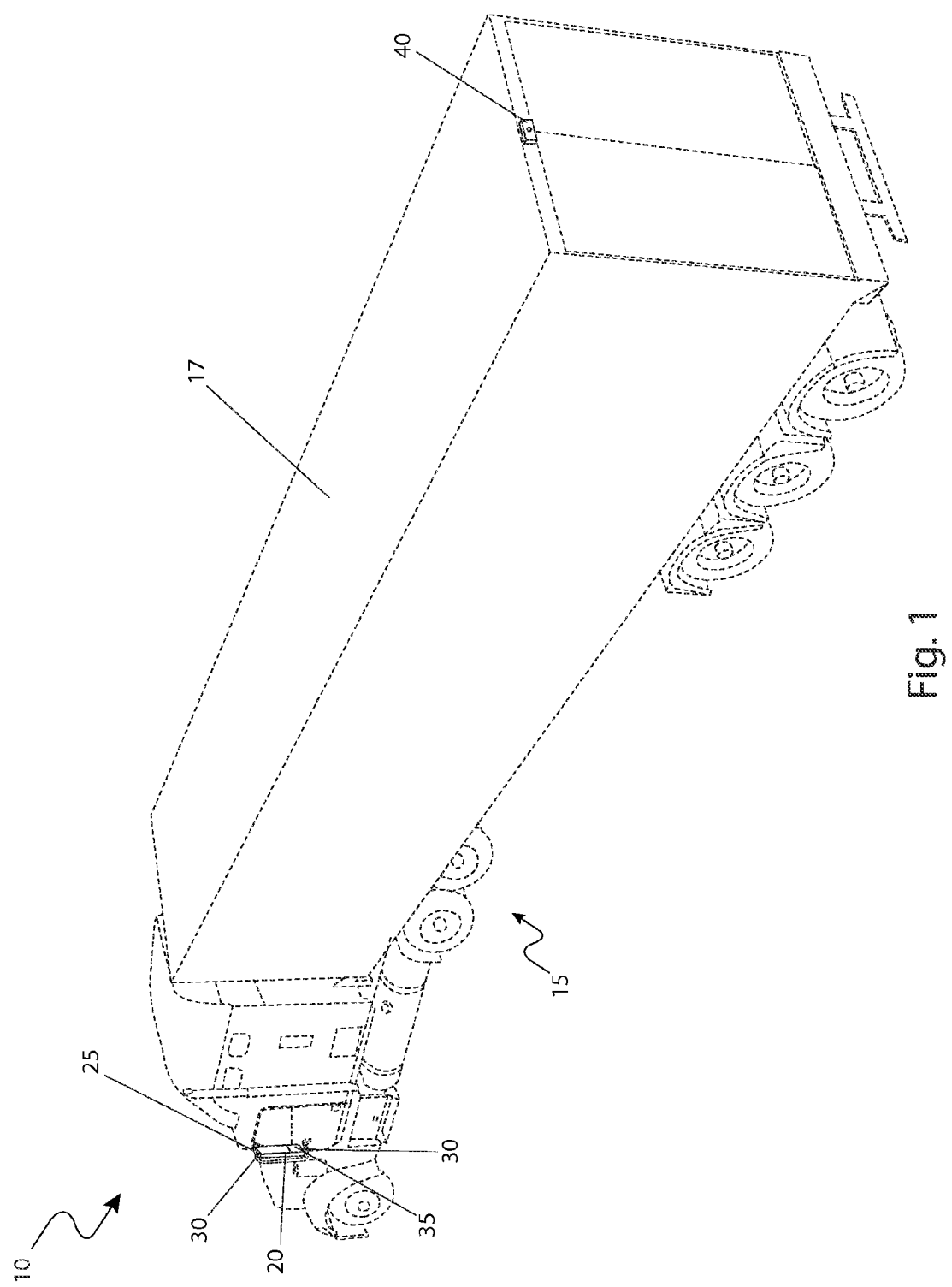
FIG. 1 is a perspective view of the side mirror system with video display 10 installed upon a truck rig 15 as viewed from a left side, or driver's side, according to the preferred embodiment of the present invention.

10 side mirror system with video display
15 semi truck rig
17 trailer
18 tractor
19 tractor door
20 mirror assembly
22 mirror frame
25 mirror mounting frame
27 dashboard
30 tamper resistant fasteners
35 video display
37 video image/signal
38 heating element
39 thermostatic switch
40 first camera
42 lens
43 camera body
45 rear surface
50 second camera
52 shroud/mount assembly
53 bracket
54 fastening means
55 forward right side surface
60 protective glass cover
65 mirrored glass portion
70 wiring harness
75 video module
76 selector knob
105 input jacks
110 camera driver
115 multiplexer circuit
120 video display drivers
125 output jacks
130 12-volt power feed
135 over-current protective device

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a side mirror system with video display (herein described as the "system") 10, which provides an electronic video image/signal 37 of side and rear areas of a large semi truck rig 15 being viewable upon a video display 35 located on a lower portion of a driver's side mirror assembly 20. The video display 35 receives images from a first camera 40 and a second camera 50 located on the rear of a trailer portion 17 and on a side tractor door 19 of a tractor portion 18 of the truck rig 15, respectively. The system 10 further comprises a video selector switch 75 allowing a user to selectively display said video image/signals 37 from each camera 40, 50, thereby viewing all sides of the trailer 17 using a single display 35 while backing up or changing lanes.

Figure 2:
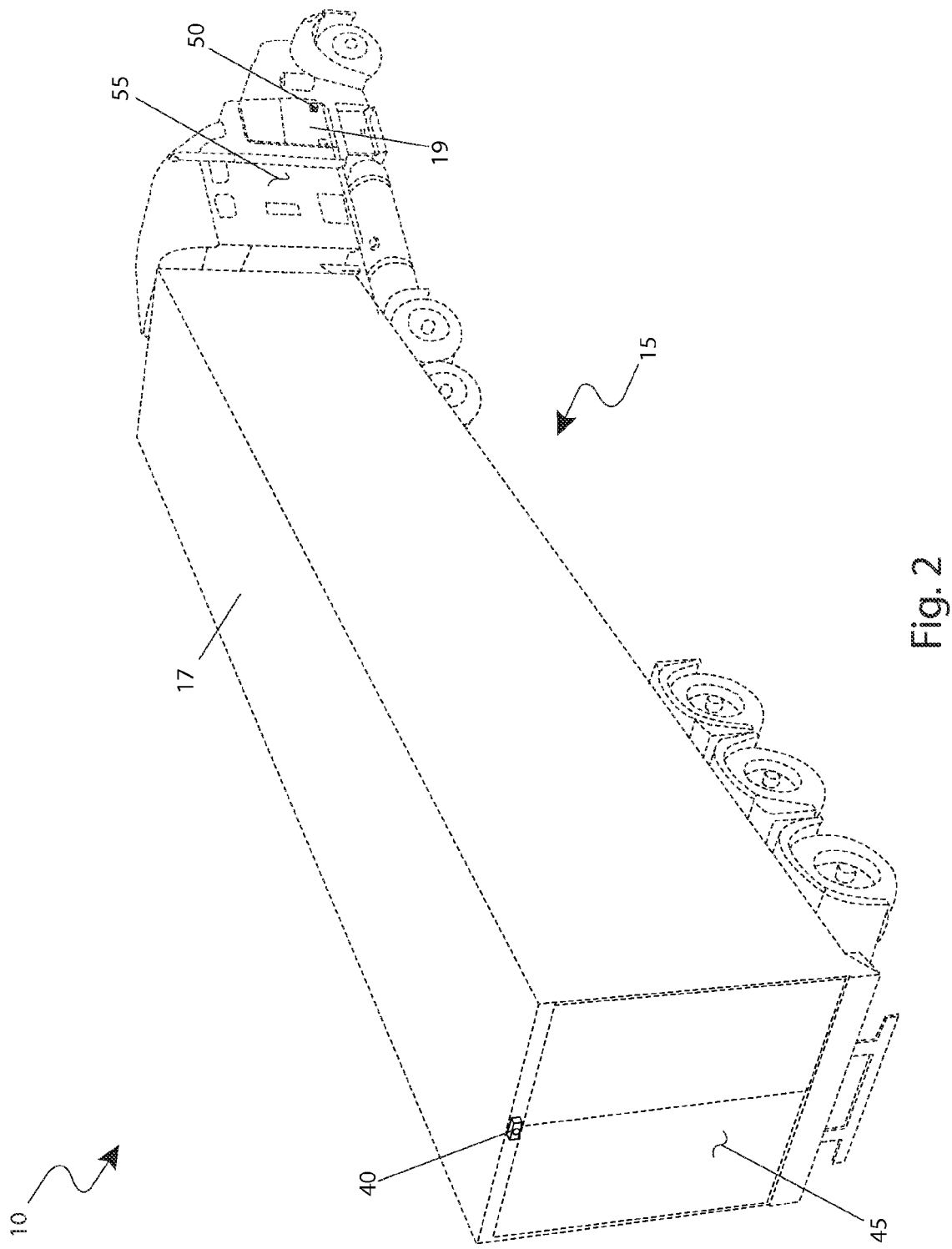
FIG. 2 is a perspective view of the side mirror system with video display 10 installed upon a truck 15, showing the right side or passenger side, according to the preferred embodiment of the present invention.

Referring now to FIGS. 1 and 2, perspective views of the system 10 installed upon a truck rig 15 as viewed from left and right sides, respectively, according to the preferred embodiment of the present invention, are disclosed. The system 10 comprises a video display 35 being integrated into a driver's side mirror assembly 20 (see FIG. 3). The system 10 further comprises a first camera 40 located at a top center portion along a rear portion of the trailer 17 while the second camera 50 would be located on a side door of a tractor portion of the truck rig 15. The cameras 40, 50 further comprise a protective shroud/mount assembly 52, a standard rectangular camera body 43, and a fixed wide-angle lens 42 which provides a one hundred-eighty degree (180°) viewing angle along side areas of the truck rig 15 (see FIG. 4). Video image/signals 37 from said cameras 40, 50 are then displayed on the video display 35. In such a manner the truck driver can look at a mirrored glass portion 65 and video display 35 portions of the mirror assembly 20 to view both sides of the truck rig 15.

The truck rig 15 is depicted as a conventional semi-trailer truck for purposes of illustration; however, other types of vehicles such as cargo vans, flatbed carriers, box vans, buses, motor homes, and the like may benefit from the features of the present invention, and as such should not be interpreted as a limiting factor of the system 10. The truck rig 15 provides conventional attachment to the driver's side mirror assembly 20 being envisioned to have identical size and occupying the same space as an original side view mirror on the side of the truck rig 15.

A first camera 40 is shown mounted upon a rear surface 45 of the truck 15 such that a full and unobstructed view of the area immediately behind the truck 15 can be achieved. A second camera 50 is preferably mounted upon a passenger-side tractor door portion 19 or alternately upon a fender or front bumper based upon a particular truck rig 15 application. Such positioning affords the second camera 50 an unobstructed view of traffic and obstructions on the right side of the truck rig 15 commonly referred to as a "blind spot". It is envisioned that both the first camera 40 and the second camera 50 comprise color miniature weatherproof closed-circuit units similar to other rear view systems which utilize current hardware and software technologies. Said cameras 40, 50 are envisioned to provide advanced video enhancement technologies such as, but not limited to: automatic color and light correction, low-light or zero-lux viewing, information overlay displaying, and the like (see FIG. 4).

Although depicted herein as a retrofit accessory to an existing truck rig 15, it is understood that the teachings of the system 10 may be provided as standard or optional equipment on new truck designs with equal benefit, and as such should not be interpreted as a limiting factor of said system 10.

Figure 3:
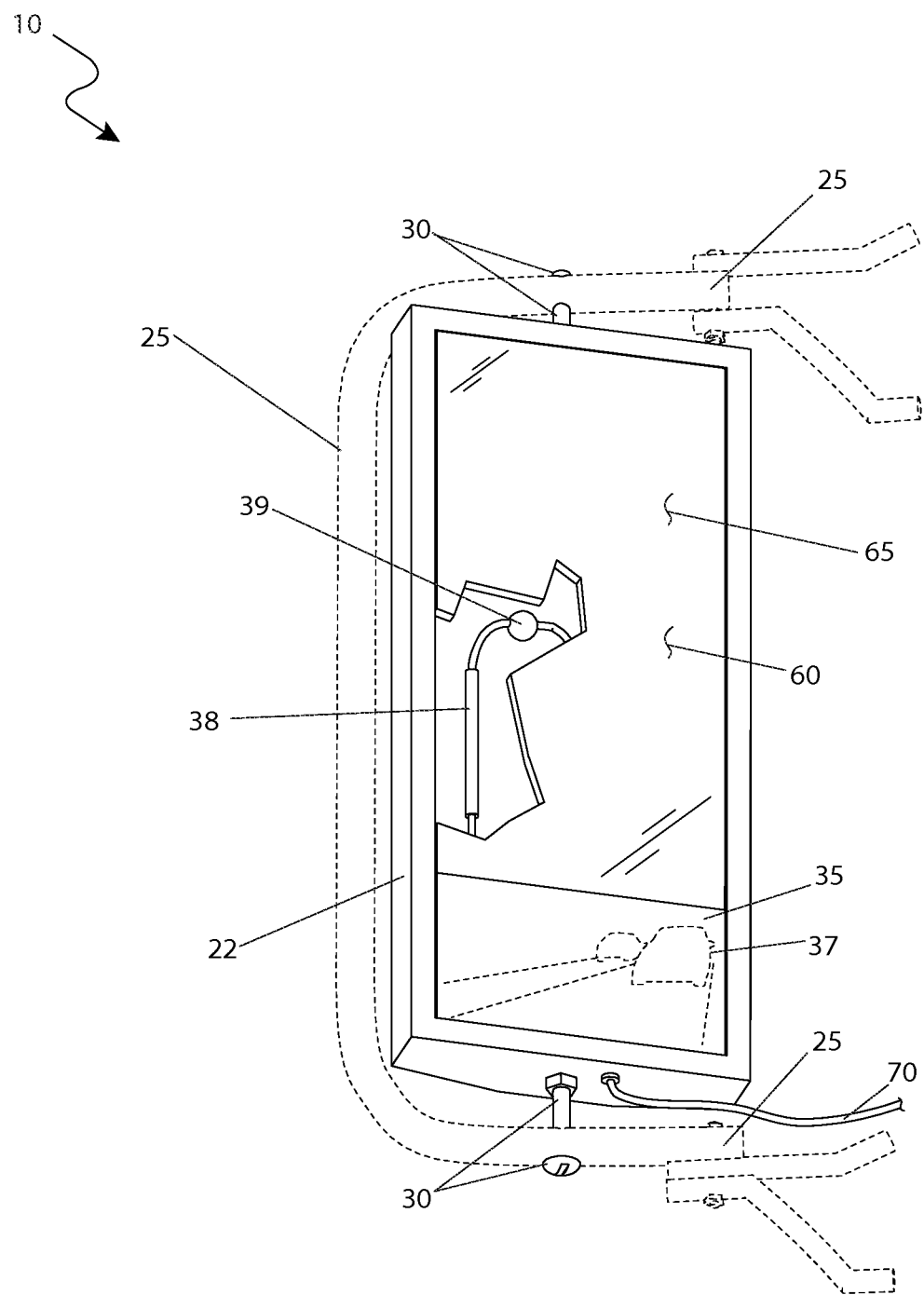
FIG. 3 is a detailed view of a mirror assembly 20 as used with the side mirror system with video display 10, according to the preferred embodiment of the present invention.

Referring now to FIG. 3, a detailed view of the mirror assembly portion 20 of the system 10, according to the preferred embodiment of the present invention, is disclosed. This figure clearly depicts the mirror assembly 20, and how it is held in place within the mirror mounting frame 25 via the tamper resistant fasteners 30. The mirror assembly 20 is depicted here taking on a form of a common West Coast Style mirror unit; however, it is understood that the teachings of the present invention 10 may be incorporated into other side mirror styles such as, but not limited to: tripod mounted mirrors, extendable mirrors, plastic molded mirrors, various towing mirrors, remote control mirrors, cab chassis mirrors, and the like and as such should not be interpreted as a limiting factor of the system 10. The mirror assembly 20 further comprises a mirror frame 22 and a protective glass cover 60. The mirror frame 22 comprises a weatherproof seal to the protective glass cover 60 and extends across a back portion of said mirror assembly 20 and around an entire perimeter edge in a conventional manner. The protective glass cover 60 provides a unitary glass surface to protect the upper mirrored glass portion 65 and the subjacent video display 35 being positioned behind said protective glass cover 60 and contained within the mirror frame 22. Said mirror assembly 20 is illustrated here being secured to a driver's side door portion of the tractor 18 being affixed to an existing mirror mounting frame 25 using a pair of tamper resistant fasteners 30 such as bolt fasteners with tamperproof heads, or equivalent tamper resistant devices. Said tamper resistant fasteners 30 are envisioned to be inserted through top and bottom members of said existing mirror mounting frame 25 and in turn threadingly engaging the mirror assembly 20 along top and bottom edges, thereby preventing unauthorized removal of said mirror assembly 20.

The video display 35 provides a displaying means of a video image/signal 37 allowing the truck driver to observe the mirrored glass portion 65 and the video display 35 to observe a rear area and both side areas of the truck rig 15 at once. The system 10 eliminates the driver having to look in several directions to check for obstructions while backing up or changing lanes.

The video display 35 is located at the lower portion of the mirror assembly 20 and is envisioned to be approximately four (4) inches in height and six (6) inches in width. The video display 35 is located behind a protective glass cover 60 which also provides a mirrored glass portion 65 occupying an upper portion of the mirror assembly 20. In such a manner, one solid protective glass cover 60 covers both the mirrored glass portion 65 and the video display 35 thus enabling easy cleaning and washing while ensuring complete weather sealing. Additionally, when the system 10 is deactivated or turned off, the video display 35 is to be discreetly contained behind the protective glass cover 60 thus discouraging theft of the mirror assembly 20. The video display 35 is envisioned to provide sufficient illuminated brightness, thereby allowing said video display 35 to be used in direct sunlight without being "washed out".

The mirror assembly 20 further comprises an internal heating means comprising an internal electric heating element 38 and an automatic thermostatic switch 39 which provide automatic snow and ice melting and removal as well as defrosting in a similar manner as other heated vehicle mirror units. The video display 35 and heating element 38 are connected to an existing 12-volt power feed 130 and the video module 75 via a multi-conductor wiring harness 70 (see FIGS. 5 and 6).

Figure 4:
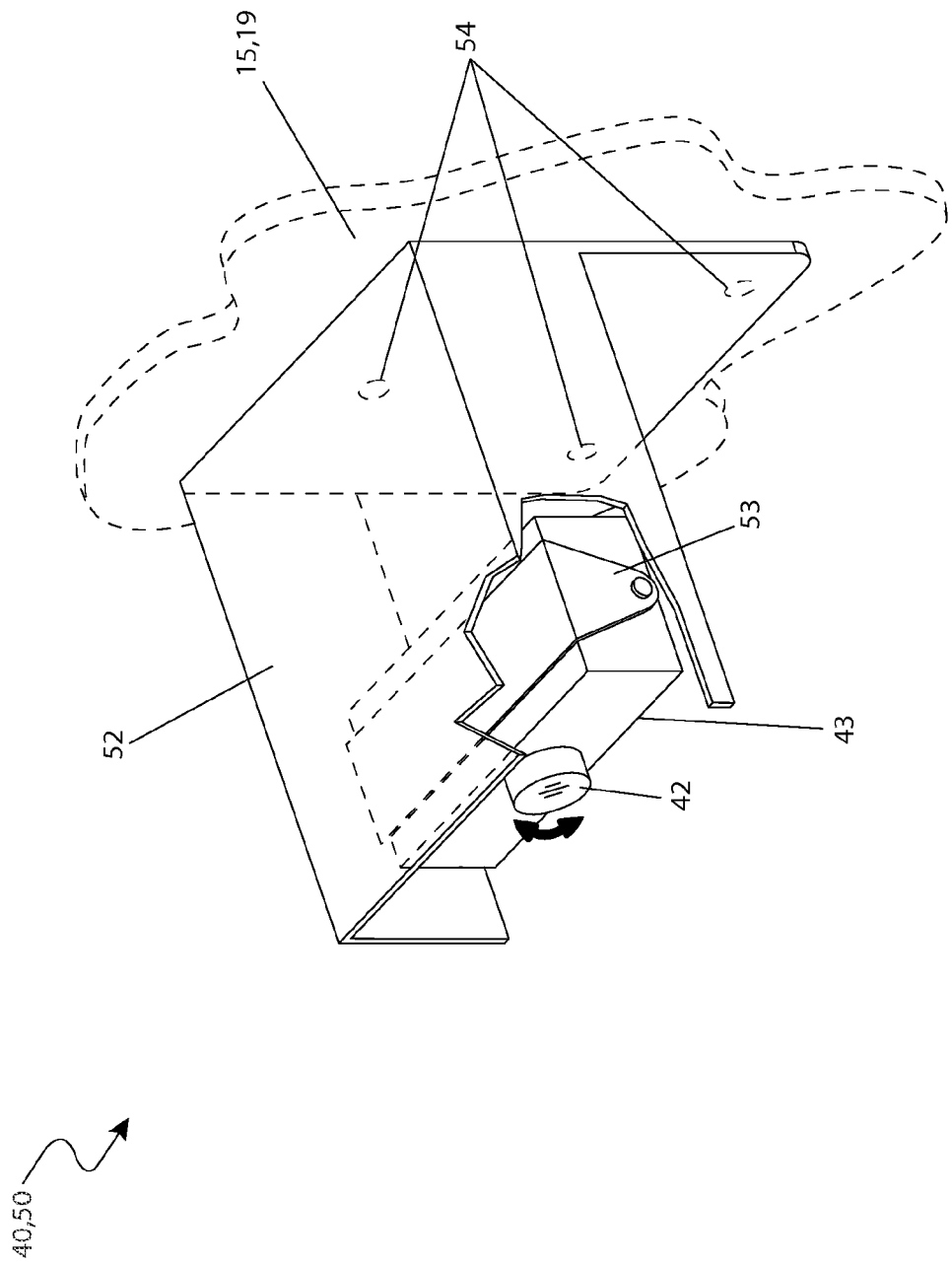
FIG. 4 is a perspective view of a camera portion 40, 50 of the side mirror system with video display 10, according to the preferred embodiment of the present invention.

Referring now to FIG. 4, perspective views of first 40 and second 50 camera portions of the system 10, according to the preferred embodiment of the present invention, are disclosed. It is also envisioned that said cameras 40, 50, as well as any other additional cameras, would be of a standard design such that various cameras currently on the market would work with the system 10. Said cameras 40, 50, comprise fixed wide-angle lenses 42 providing a 180-degree viewing angle along side areas of the truck rig 15. Said cameras 40, 50 further comprise respective shroud/mount assemblies 52 which provide protective attachment to surfaces of the truck rig 15. Each shroud/mount assembly 52 provides protection to the rearwardly-facing camera 40, 50 from possibly damaging projectiles, weather, dust, accidental impact, and the like, as well as keeping the aforementioned lens 42 clean during transport. Each shroud/mount assembly 52 further comprises a "U"-shaped camera tilting bracket 53 and a plastic-molded three-sided enclosure having an integral mounting panel portion which extends outwardly from said three-sided shroud portion to provide a means to affix said shroud/mount assembly 52 to various external surfaces of the truck rig 15 using a common fastening means 54 such as threaded fasteners and respective apertures; however, it is understood that various protective enclosure designs may be utilized to protect said cameras 40, 50 without deviating from the basic concept and as such should not be interpreted as a limiting factor of the system 10.

The cameras 40, 50 and the video display 35 are connected to a video module 75 via a wiring harness 70. The video module 75 is envisioned to be located within a cab portion of the tractor 18 being integrated into a dashboard portion 27. A video image/signal 37 from each camera 40, 50 is conducted to the video module 75 which provides a means to control display of each video image/signal 37 for a pre-set duration or allow a user to manually select and display either camera 40, 50 on a permanent basis (see FIG. 5).

Figure 5:
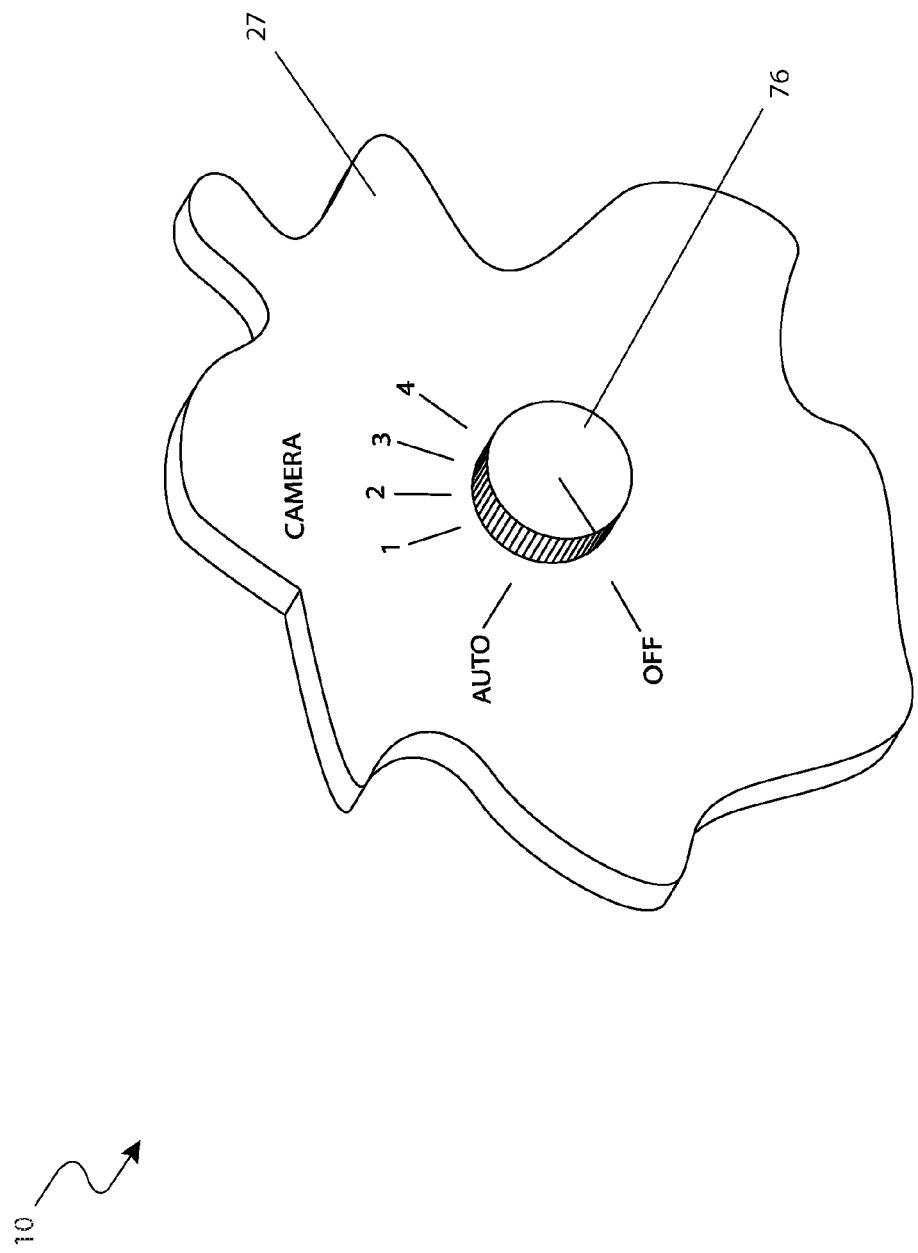
FIG. 5 is a front view of a video module 75 as used with the side mirror system with video display 10, according to the preferred embodiment of the present invention; and, FIG. 6 is an electronic block diagram depicting the major electrical components as used with the side mirror system with video display 10.

Referring next to FIG. 5, a front view of the video module 75 as used with the system 10, according to the preferred embodiment of the present invention, is disclosed. The video image/signal 37 from each camera 40, 50 would be routed to the video module 75 via a wiring harness 70. The video module 75 comprises a microprocessor-based module comprising electronic and electrical equipment including a multiplexer circuit 115 and a plurality of video display drivers 120 to perform advanced automatic video functions such as, but not limited to: brightness adjustment, contrast adjustment, image orientation, low-light or zero-lux mode switching, heads-up data display, and the like (see FIG. 6).

Said video module 75 further comprises a digit-operated selector knob 76 allowing an operator to access functions including an ON/OFF function, an "AUTO" function to perform a sequential display of each video/image signal 37 for a pre-set interval, and selection of a particular video/image signal 37 from a respective camera 40, 60. The video module 75 is envisioned to be mounted upon a portion of a dashboard 27 within convenient reach of the operator such that it may be easily reached while driving.

The preferred embodiment of the system 10 comprises only two (2) cameras 40, 50; however, the video module 75 is envisioned to provide a capability to receive inputs from additional cameras, for example, up to four (4) cameras as seen here. Said additional cameras may be located in various positions on the truck rig 15 such as, but not limited to: the stowage location, a forward facing camera, and the like.

Figure 6:
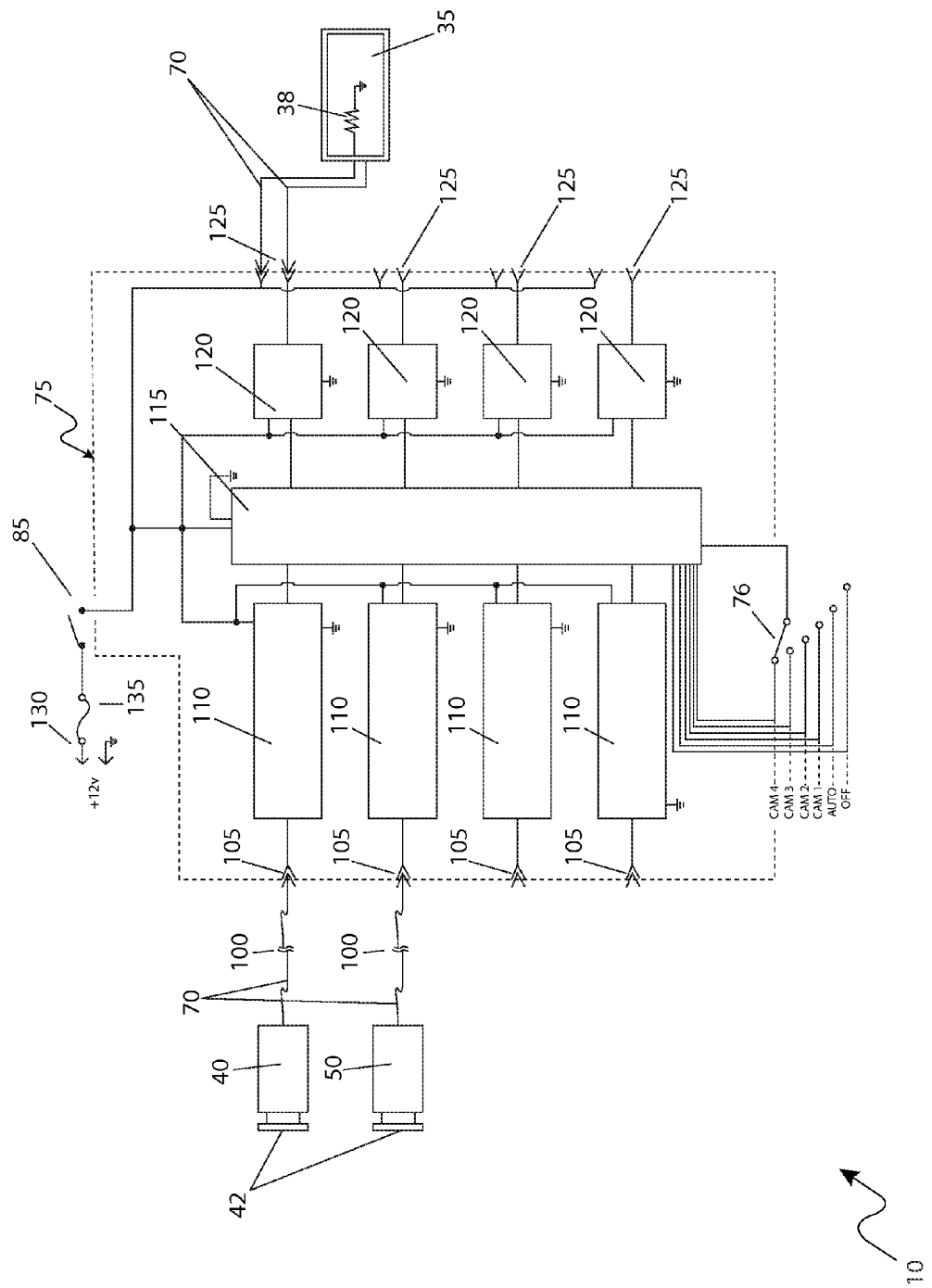

Referring finally to FIG. 6, an electronic block diagram depicting the major electrical components as used with the system 10 is depicted. Video image/signals 37 from the first 40 and second 50 cameras are output to the video display 35 via the video module 75. A plurality of input jacks 105 located upon a rear surface of the video module 75 provide connection of said cameras 40, 50 and any number of additional cameras to the video module 75 by way of a conventional wiring harness 70 containing power conductors and video coaxial cables. Said input jacks 105 connect said video image/signals 37 to respective camera drivers 110. The output signal from each camera driver 110 then serves as an input to a multiplexer circuit 115. The multiplexer circuit 115 is controlled by an input signal from the selector knob portion 76. An output signal from the multiplexer circuit 115 in turn serves one (1) or more video display drivers 120, four (4) being shown here for illustration sake, which display the video image/signal 37. The video display drivers 120 provide automatic functions such as brightness adjustment, contrast adjustment, image orientation, low-light or zero-lux mode switching, and the like. The video display drivers 120 communicate said video image/signal 37 through respective output jacks 125, also located on the rear of the video module 75.

The extra output video image/signals 37 may be used for other purposes such as remote displays, time lapsed video recording, satellite feeds, and the like. The video image/signal 37 in turn is displayed upon the video display 35 via the wiring harness 70. Said wiring harness 70 is envisioned to be of a conventional design comprising common expected features such as, but not limited to: bundled or ribbon-type insulated copper conductors, terminating connectors, anchoring hardware, and the like. Electrical power for the heating element 38 and all electronic components of the system 10 is provided by a 12-volt power feed 130 from the vehicle's existing electrical system. Said electrical feed is envisioned to be protected by an over-current protective device 135 such as a fuse. Control of the existing 12-volt power feed 130 to the system 10 is provided by selection of the ON/OFF function using the selector knob 76.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it is envisioned that the system 10 would be installed upon a truck rig 15 by a qualified automotive electrician as indicated in FIGS. 1 and 2.

The method of installing the system 10 may be achieved by performing the following steps: procuring a model of the system 10 for application onto a desired make and model truck rig 15 as well as having a desired number of cameras; mounting the first camera 40 to the bracket portion 53 of the shroud/mount assembly 52, if not previously installed; mounting the first camera 40 and shroud/mount assembly 52 above a rear door portion of the trailer 17 using the supplied fastening means 54; mounting the second camera 50 upon a tractor door portion 19 of the tractor 18 in like manner as the previously described first camera 40; mounting any other cameras as needed so as to observe an intended area and direction; disassembling and removing the original mirror portion of the mirror assembly from the driver's door portion of the tractor 18; mounting the mirror assembly portion 20 of the system 10 to the existing mirror frame 25 using the tamper resistant fasteners 30; mounting the video module 70 to a dashboard area of the tractor 18; routing and connecting the wiring harness 70 to all cameras 40, 50, the video display 35, and the video module 75; and, anchoring the wiring harness 70 to the truck rig 15 in a conventional manner using common fastening means such as fasteners, brackets, tie-wraps, and the like as needed.

The method of utilizing the system 10 may be achieved by performing the following steps: switching electrical power to the system 10 using the ON/OFF position of the selector knob 76; selecting the "AUTO" sequential display mode or continuous display of a particular camera 40, 60, as desired; making final adjustments of viewing angles of the cameras 40, 50 using the tilt bracket portions 53 of each shroud/mount assembly 52; allowing the heating element 38 within the mirror assembly 20 to defrost and remove ice and snow from the protective glass cover 60 in an automatic manner via the automatic thermostatic switch 39; and, observing the mirrored glass portion 65 and the video display portion 35 of the mirror assembly 20 while operating the truck rig 15 in a normal manner to back up or while changing lanes; and, benefiting from increased safety, visibility, and confidence afforded a user of the present invention 10.

Selection of the "AUTO" display mode of the system 10, affords a driver a pre-set timed view of each side of the truck rig 15 while looking at the mirror assembly 20 in an automatic and sequential manner.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A semi truck rig side minor system for providing video images illustrating exterior areas of a semi truck rig, said semi truck rig side mirror system comprising: a first camera adapted to be mounted to a rear upper portion of said semi truck rig; a second camera adapted to be mounted to a side door of said semi truck rig; a side mirror assembly spaced from said first and second cameras and capable of being attached to the semi truck rig; a video display located at a lower portion of said side mirror assembly; and, a video switcher capable of being located within a cab portion of the semi truck rig, comprising: a switching speed potentiometer receiving said video images from each of said first and second cameras and thereafter displaying said video images for a pre-determined time; a camera selector switch; a plurality of input jacks connected to said camera selector switch; a plurality of multiplexer circuits controlled by said camera selector switch; and, a plurality of video display drivers connected to said multiplexer circuits; wherein said video switcher automatically changes said video images between said cameras and thereby sequentially displays the exterior areas while viewing said side mirror assembly; and, wherein said selector switch causes a sequential display of said video images on a timed basis, wherein the time interval of said sequential display is adjusted by said switching speed potentiometer.

2. The semi truck rig side minor system of claim 1, wherein each of said first and second cameras comprises:
a mount assembly capable of being attached to an exterior surface of the semi truck rig;
a body attached to said protective mount assembly; and,
a lens attached to said body and capable of providing a 180-degree viewing angle along the exterior areas of the semi truck rig;
wherein said first and second cameras are spaced apart along the exterior surface of the semi truck rig.

3. The semi truck rig side mirror system of claim 1, wherein said side minor assembly is capable of being mounted to an existing minor mounting frame of the semi truck rig, said side mirror assembly comprising:
a mirror frame;
a mirrored glass portion attached to said minor frame and located on an upper portion of said side minor assembly; and,
a protective glass cover attached to said mirror frame;
wherein glass cover covers said mirrored glass portion and said video display; and,
wherein said video display illustrates said video image beneath said mirrored glass portion.

4. The semi truck rig side mirror system of claim 1, wherein said video display is located at the lower portion of said mirror assembly and positioned behind said protective glass cover and contained within said minor frame.

5. The semi truck rig side mirror system of claim 1, further comprising:
an internal electric heating element located within said side minor assembly; and,
an automatic thermostatic switch electrically coupled to said internal electric heating element.

6. The semi truck rig side minor system of claim 2, wherein said mount assembly comprises: a U-shaped camera tilting bracket rotatably located therein.

7. A semi truck rig side minor system for providing video images illustrating exterior areas of a semi truck rig, said semi truck rig side mirror system comprising: a first camera adapted to be mounted to a rear upper portion of said semi truck rig and facing rearwardly relative to a front end thereof; a second camera adapted to be mounted to a side door of said semi truck rig and facing rearwardly relative to a front end thereof; a side mirror assembly spaced from said first and second cameras and capable of being attached to the semi truck rig; a video display located at a lower portion of said side mirror assembly; and, a video switcher capable of being located within a cab portion of the semi truck rig, comprising: a switching speed potentiometer receiving said video images from each of said first and second cameras and thereafter displaying said video images for a pre-determined time; a camera selector switch; a plurality of input jacks connected to said camera selector switch; a plurality of multiplexer circuits controlled by said camera selector switch; and, a plurality of video display drivers connected to said multiplexer circuits; wherein said video switcher automatically changes said video images between said cameras and thereby sequentially displays the exterior areas while viewing said side mirror assembly; and, wherein said selector switch causes a sequential display of said video images on a timed basis, wherein the time interval of said sequential display is adjusted by said switching speed potentiometer.

8. The semi truck rig side mirror system of claim 7, wherein each of said first and second cameras comprises:
a mount assembly capable of being attached to an exterior surface of the semi truck rig;
a body attached to said protective mount assembly; and,
a lens attached to said body and capable of providing a 180-degree viewing angle along the exterior areas of the semi truck rig;
wherein said first and second cameras are spaced apart along the exterior surface of the semi truck rig.

9. The semi truck rig side minor system of claim 7, wherein said side minor assembly is capable of being mounted to an existing minor mounting frame of the semi truck rig, said side mirror assembly comprising:
a mirror frame;
a mirrored glass portion attached to said minor frame and located on an upper portion of said side minor assembly; and,
a protective glass cover attached to said mirror frame;
wherein glass cover covers said mirrored glass portion and said video display; and,
wherein said video display illustrates said video image beneath said mirrored glass portion.

10. The semi truck rig side minor system of claim 7, wherein said video display is located at the lower portion of said mirror assembly and positioned behind said protective glass cover and contained within said mirror frame.

11. The semi truck rig side mirror system of claim 7, further comprising:
an internal electric heating element located within said side mirror assembly; and,
an automatic thermostatic switch electrically coupled to said internal electric heating element.

12. The semi truck rig side mirror system of claim 8, wherein said mount assembly comprises: a U-shaped camera tilting bracket rotatably located therein.

13. The semi truck rig side mirror system of claim 7, wherein said video switcher comprises: a switching speed potentiometer receiving said video images from each of said first and second cameras and thereafter displaying said video images for a pre-determined time.

14. The semi truck rig side mirror system of claim 13, wherein said video switcher further comprises:
a camera selector switch;
a plurality of input jacks connected to said camera selector switch;
a plurality of multiplexer circuits controlled by said camera selector switch; and,
a plurality of video display drivers connected to said multiplexer circuits.

15. The semi truck rig side mirror system of claim 14, wherein said selector switch causes a sequential display of said video images on a timed basis, wherein the time interval of said sequential display is adjusted by said switching speed potentiometer.

16. A method of utilizing a semi truck rig side mirror system for providing video images illustrating exterior areas of a semi truck rig, said method comprising the steps of: providing and attaching a first camera to a rear upper portion of said semi truck rig; providing and attaching a second camera to a side door of said semi truck rig; rearwardly facing said first and second cameras relative to a front end of the semi truck rig; attaching a side mirror assembly to the semi truck rig; providing and spacing said side mirror assembly from said first and second cameras; providing and locating a video display at a lower portion of said side mirror assembly; providing and locating a video switcher comprising: a switching speed potentiometer receiving said video images from each of said first and second cameras and thereafter displaying said video images for a pre-determined time, a camera selector switch, a plurality of input jacks connected to said camera selector switch, a plurality of multiplexer circuits controlled by said camera selector switch, and a plurality of video display drivers connected to said multiplexer circuits within a cab portion of the semi truck rig; and, said video switcher automatically changing said video images between said cameras and thereby sequentially displays the exterior areas while viewing said side mirror assembly; wherein said selector switch causes a sequential display of said video images on a timed basis, wherein the time interval of said sequential display is adjusted by said switching speed potentiometer.

* * * * *